United States Patent [19]
Hsu

[11] Patent Number: 5,442,979
[45] Date of Patent: * Aug. 22, 1995

[54] TWIST DRILL

[75] Inventor: George Hsu, Martinez, Ga.

[73] Assignee: Greenfield Industries, Inc., Augusta, Ga.

[*] Notice: The portion of the term of this patent subsequent to Apr. 30, 2008 has been disclaimed.

[21] Appl. No.: 954,141

[22] Filed: Sep. 30, 1992

Related U.S. Application Data

[63] Continuation of Ser. No. 674,906, Mar. 26, 1991, abandoned, which is a continuation of Ser. No. 168,074, Mar. 14, 1988, Pat. No. 5,011,342.

[51] Int. Cl.$^6$ .............................................. B23B 51/02
[52] U.S. Cl. .................................. 76/108.6; 408/224; 408/230
[58] Field of Search ............... 408/223, 224, 225, 227, 408/230; 76/101.1, 108.1, 108.6

[56] References Cited

U.S. PATENT DOCUMENTS

| | | |
|---|---|---|
| 1,069,930 | 8/1913 | Down . |
| 1,467,491 | 9/1923 | Oliver . |
| 2,193,186 | 3/1940 | Bannister . |
| 2,201,159 | 5/1940 | Clow . |
| 2,230,645 | 2/1941 | Jones . |
| 2,328,629 | 9/1943 | Eich et al. . |
| 2,404,048 | 7/1946 | Gepfert . |
| 2,600,286 | 6/1952 | Weiland . |
| 2,805,522 | 9/1957 | Dayton . |
| 2,817,983 | 12/1957 | Mossberg . |
| 2,889,725 | 6/1959 | Turton et al. . |
| 2,936,658 | 6/1960 | Riley . |
| 2,966,081 | 12/1960 | Kallio . |
| 3,040,605 | 6/1962 | Anderson . |
| 3,089,354 | 5/1963 | Class et al. . |
| 3,109,270 | 11/1963 | Haggerty . |
| 3,116,654 | 1/1964 | Nider . |
| 3,125,931 | 3/1964 | Stanaback . |
| 3,452,625 | 7/1969 | Russo . |
| 3,521,405 | 7/1970 | Mackey et al. . |

(List continued on next page.)

FOREIGN PATENT DOCUMENTS

| | | |
|---|---|---|
| 0103235 | 12/1986 | European Pat. Off. . |
| 2583667 | 12/1986 | France . |
| 7033288 | 8/1971 | Germany . |
| 3205051C2 | 12/1983 | Germany . |
| 3344620A1 | 6/1985 | Germany . |
| 3706282A1 | 9/1987 | Germany . |
| 123605 | 3/1919 | United Kingdom . |
| 1426678 | 3/1976 | United Kingdom . |
| 2016316A | 9/1979 | United Kingdom . |
| 2083767A | 3/1982 | United Kingdom . |
| 1060344 | 12/1983 | U.S.S.R. . |
| 1238905 | 6/1986 | U.S.S.R. . |
| 1278117 | 12/1986 | U.S.S.R. . |

OTHER PUBLICATIONS

"A New Angle on Drill Points" from *American Machinist*, p. 55, 1982.

"Drill Grinders Produce 'Three Rake Geometry," from *American Machinist*, p. 165, Jan. 1982.

Ni Che-fu and Yu Chi-shun, The Ni Che-Fu Drill, Contributions at the 1964 Peking Symposium, pp. 589–614.

(List continued on next page.)

*Primary Examiner*—Daniel W. Howell
*Attorney, Agent, or Firm*—Dickstein, Shapiro & Morin

[57] ABSTRACT

A twist drill having a longitudinal axis, a shank portion sized and shaped to be grasped by a twisting tool, and a barrel portion for cutting a workpiece. The barrel portion has a number of flutes formed therein spiraling about the axis and terminating at a point end of the barrel portion. The point end has a number of point surfaces including an inner flank surface, an outer flank surface, a groove surface positioned between the inner and outer flank surfaces and a split surface. The inner flank surface extends from the center of the point end to the inner extent of the groove surface and the outer flank surface extends from the outer diameter of the point end to the outer extent of the groove surface.

19 Claims, 4 Drawing Sheets

U.S. PATENT DOCUMENTS

| | | |
|---|---|---|
| 3,592,555 | 7/1971 | Mackey, Sr., et al. . |
| 3,610,075 | 10/1971 | Fabish . |
| 3,667,857 | 6/1972 | Shaner et al. . |
| 3,674,101 | 7/1972 | Chromy . |
| 3,680,262 | 8/1972 | Aydelott et al. . |
| 3,848,483 | 11/1974 | Wall et al. . |
| 4,209,275 | 6/1980 | Kim . |
| 4,218,162 | 8/1980 | Hillier . |
| 4,222,690 | 9/1980 | Hosoi . |
| 4,248,555 | 2/1981 | Satou . |
| 4,285,620 | 8/1981 | Luebbert et al. . |
| 4,340,327 | 7/1982 | Martins . |
| 4,381,162 | 4/1983 | Hosoi . |
| 4,400,119 | 8/1983 | Clement . |
| 4,440,532 | 4/1984 | D'Apuzzo . |
| 4,456,411 | 6/1984 | Clement . |
| 4,470,733 | 9/1984 | Marques, Jr. . |
| 4,529,341 | 6/1985 | Greene . |
| 4,565,473 | 1/1986 | Hosoi . |
| 4,583,888 | 4/1986 | Mori et al. . |
| 4,594,034 | 6/1986 | Maier . |
| 4,595,322 | 6/1986 | Clement . |
| 4,602,900 | 7/1986 | Arpaio, Jr. et al. . |
| 4,605,347 | 8/1986 | Jodock et al. . |
| 4,620,822 | 11/1986 | Hague et al. . |
| 4,671,710 | 6/1987 | Araki . |
| 4,884,571 | 12/1989 | Baker . |
| 4,968,193 | 11/1990 | Chaconas et al. . |
| 5,011,342 | 4/1991 | Hsu ........................................ 408/230 |

OTHER PUBLICATIONS

Bi–Guang Cheng, Qunzuan, Bejing Young–Ding Machinery Factory, 1982, pp. 234–239, 312–317.

Imshennik, Spiral Drills, Collection of Materials of All–Union Meeting on Spiral Drills, Moscow (1966) p. 154.

Dyikov & Yasingky, Progressive Cutting Tools for Machine Building, 2d ed., Leningrad, (1974) p. 152.

Mathematical Model for Multifacet Drills by Wu and Shen, University of Wisconsin–Madison, Department of Mechanical Engineering, Mar. 1981, revised Jan. 1983.

"Selecting Your Drill Point Geometry," from Cutting Tool Engineering, pp. 16–18, May 1968.

Tool and Manufacturing Engineers Handbook, vol. 1, Machining, Society of Manufacturing Engineers, 1983, pp. 9–42.

TWIST DRILL

This application is a continuation of application Ser. No. 07/674,906, filed Mar. 26, 1991, now abandoned, which in turn is a continuation of Ser. No. 07/168,074, filed Mar. 14, 1988, now U.S. Pat. No. 5,011,342.

BACKGROUND

The present invention relates generally to a twist drill and more particularly to a multi-surface drill point geometry.

A drill is a rotating-end cutting tool for creating or enlarging holes in a workpiece of solid material. A drill is also known as a drill bit. A twist drill is a drill having one or more spiral or helical grooves or flutes, extending from the point to the smooth part of the shank, for rejecting cuttings. The portion of the twist drill along which the flutes spiral is called the barrel. Between the flutes are wing shaped blades connected along the axis of rotation of the twist drill by the web portion of the barrel. The flutes spiral in a direction such that the material cut by the twist drill is carried away from the point through the flutes along the barrel to be expelled upon reaching the surface of the workpiece.

Most of the cutting work of a twist drill is accomplished at the end of the barrel referred to as the point of the twist drill. The spiraling leading edges of the wing shaped blades extending along the barrel form the margins that provide side support and centering of the drill in the hole being cut. The drill point experiences severe stress and heat conditions in use. Optimally, the twist drill should perform so as to drill a hole straight into the workpiece and not wander and change direction, to have a reasonable lifetime and to not tend to fail due to fracturing or to exhibit excessive wear of the cutting edges.

The leading edge of the wing shaped blade at the point of the drill does most of the cutting work of the drill and acts to slice through the bottom of the hole in the workpiece shaving off a sliver of material of the workpiece. This sliver is formed in a spiral and tends to come off in a curl shape, due in part, to the differences in its length from its inside edge which is being cut from the center of the hole to its outside edge which is being cut from the outside of the hole. Because of the forces on this sliver it tends to break after it gets to a certain length, forming a chip. The formation of these chips causes wear in the cutting edges of the twist drill. It is known to form the point surfaces of twist drills such that the point cutting edges are varied in depth in a non-linear fashion to an extent so as to break up the chip or to create narrow chips. This kind of construction may, if properly designed, decrease wear on the point cutting edges and may also enable cutting with less torque being applied to the twist drill.

Another problem encountered by twist drills, as mentioned above, is the ability of the drill to maintain its direction and drill a straight hole and not wander off to the side. In typical standard twist drills, at the point of the drill where the faces of the cutting blades come together, a ridge is formed that is referred to as the chisel. The greater the chisel width, the greater the tendency of the twist drill to wander and not drill straight through the material. Furthermore, as the chisel width increases, there is an increased area of the center of the hole being drilled that is not being cut by a cutting surface but, rather, is being extruded and forced away by the chisel surface. Greater force is required to remove material by this chisel action than is required to remove it by slicing it with a cutting edge. Therefore, as the chisel width increases, both the axial force and the time required to drill a hole tend to increase. In a number of known configurations to minimize the chisel width, a portion of the point surface at the trailing and non-cutting edge of the cutting blade is ground away from near the center of the twist drill, at its axis of rotation, out to the periphery of the drill, thus eliminating most of the chisel width. This type of twist drill is commonly referred to as a split point twist drill. See: Cutting Tool Engineering, May 1968, page 16; American Machinist, January 1982, page 55; U.S. Pat. Nos. 2,936,658; 1,467,491; 4,222,690; 4,381,161; 4,456,411; 4,605,347. The split point twist drill cuts easily through material, having eliminated a substantial portion of the chisel, however known designs have been prone to be short-lived, suffering fracture failure.

Many attempts have been made to design a multi-surfaced drill. In Clement, U.S. Pat. No. 4,456,411, a groove is cut in the cutting face of a standard drill. Also, many attempts have been made by the Chinese over the past thirty years to develop a multi-surfaced, sometimes referred to as multi-faceted, twist drill that exhibits all the desirable characteristics discussed above. Some multi-surfaced point designs have been found to exhibit superior qualities. Unfortunately these designs because of their complexity, have not been economically manufacturable. Indeed, the superior Chinese design multi-surfaced drills are made by hand.

Attempts at improving the drill point face geometry have extended over many decades and numerous variations of face geometries have been tried. Yet a superior multi-surfaced drill design has not emerged which can be economically mass-produced.

SUMMARY OF THE INVENTION

The difficulties of the prior art have to a great extent been alleviated by the present invention which provides a drill point geometry having a split-face design with a conical, spiral or planar groove formed in the cutting face to form a multi-surfaced drill point geometry. This construction yields superior results and is simple and economical to manufacture. The twist drill according to the present invention has been found to exhibit cutting speed and life properties approaching those exhibited by the hand made Chinese drills. Moreover, the twist drill according to the present invention may be mass produced using existing equipment with some modification.

It is an object of the invention to provide a twist drill exhibiting superior cutting, durability and accuracy properties.

It is another object of the invention to provide a twist drill with the foregoing advantages and which is multi-faceted.

It is a further object of the invention to provide a twist drill having the foregoing advantages and which is economical and practical to mass produce.

Other objects and advantages of the present invention will be readily apparent from the following description and drawings of preferred embodiments of the invention.

DETAILED DESCRIPTION OF PREFERRED EMBODIMENTS

Figure 1:
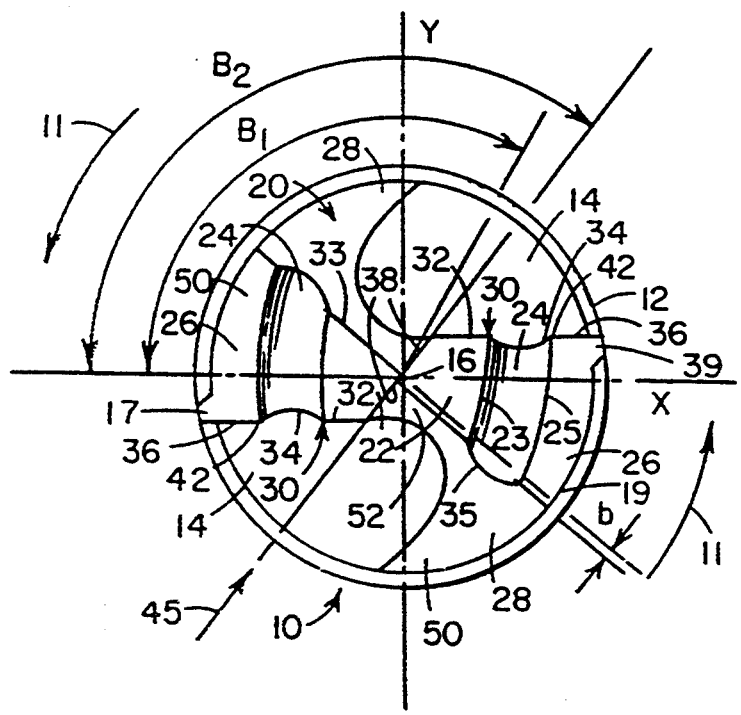
FIG. 1 is a point end view of the first embodiment of a twist drill according to the present invention.
Figure 2:
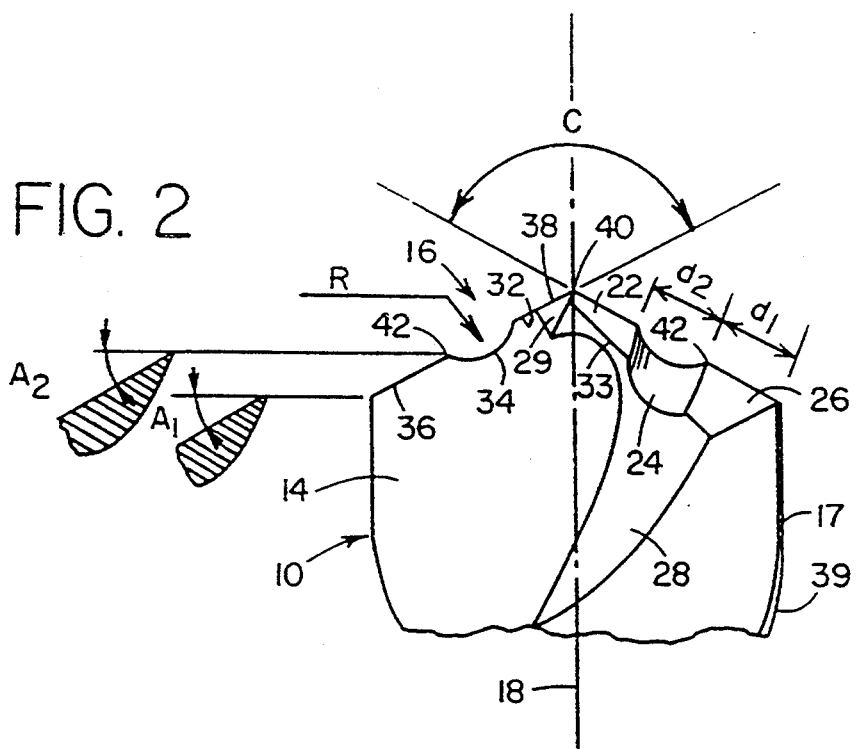
FIG. 2 is a partial side view of the drill of FIG. 1.

Refer now to FIGS. 1 and 2 which illustrate a first preferred embodiment of a twist drill, generally designated by reference numeral 10, according to the present invention. The twist drill 10 is made from a longitudinally extending rod having a longitudinal axis of symmetry 18 and a shank portion (not shown) sized and shaped to be grasped by a twisting tool such as an electric power drill. The twist drill 10 has a barrel portion 12 with cutting edges for drilling a hole in a workpiece. The barrel portion 12 includes two flutes 14 spiraling about the axis 18 and terminating at the point end 16 of the barrel portion 12. Formed between the two spiraling flutes 14 are two side blades 50 that are wing-shaped in cross-section and connected together at axis 18 by web 52. Side blades 50 spiral along the length of barrel 12 and have margins 39 at diameter 17. In use, the twist drill is rotated in the direction of arrows 11 and thrust forward into the workpiece. All cutting edges are leading edges with respect to that direction of rotation. The portion of wings 50 trailing behind margins 39 has a reduced diameter 19 referred to as the side blade clearance diameter.

The point end 16 has a number of point surfaces 20, including an inner flank surface 22, an outer flank surface 26, a groove surface 24 positioned between the inner and outer flank surfaces and a split surface 28. The inner flank surface 22 extends from the center or inner peak 40 of the point end 16 to the inner extent of the groove surface 24 to form groove inner edge 23. The outer flank surface 26 extends from the outer diameter 17 of point end 16 to the outer extent of groove surface 24 to form groove outer edge 25. The split surface 28 is formed on twist drill 10 to control the chisel width b.

Figure 7:
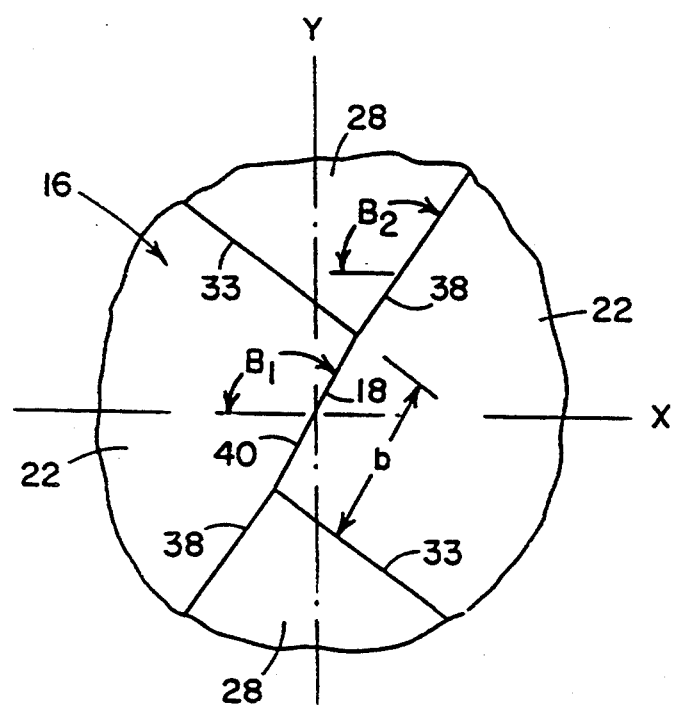
FIG. 7 is an enlarged view of the center of the point end of FIG. 1.

Refer now to FIG. 7 which shows an enlarged view of the geometry of point end 16 near axis 18. The primary chisel angle $B_1$ is the angle between the direction along the primary chisel or inner peak 40 and the direction along the cutting edge 30 at diameter 17, shown as the X axis in the figures. The Y axis is normal to the X axis. The secondary chisel angle $B_2$ is the angle between the secondary chisel edge 38 and the X axis. The chisel width b is the length of the normal distance between the lines defined by heel edges 33 from the point end view of the drill.

The point cutting edge 30 of the drill point 16 is formed by the intersection of the drill point surface 20, including inner flank surface 22, groove surface 24 and outer flank surface 26, and the flute 14. The surface of the flute along the cutting edge is referred to as the rake surface and the angle that surface makes with axis 18 is referred to as the rake angle.

Progressing from the inner peak 40 of the drill point 16 to the outside diameter 17, the point cutting edge 30 includes a secondary chisel edge 38 formed by the intersection of the inner flank surface 22 and side split surface 29 and then an inner cutting edge 32 formed by the intersection of the inner flank surface 22 and the flute 14. Next is the arc cutting edge 34 formed by the intersection of the groove surface 24 and the flute 14 and last is the outer cutting edge 36 formed by the intersection of the outer flank surface 26 and the flute 14. Extending from the center peak 40 to the innermost extent of the inner cutting edge 32 and formed by the intersection of the inner flank surface 22 and the side split surface 29 is the secondary chisel edge 38. Chisel edge 38 acts as a cutting edge. The rake angle, which is between the axis 18 and the side split surface 29 as viewed from direction 45, is about zero to about five degrees and is preferably positive.

Figure 8:
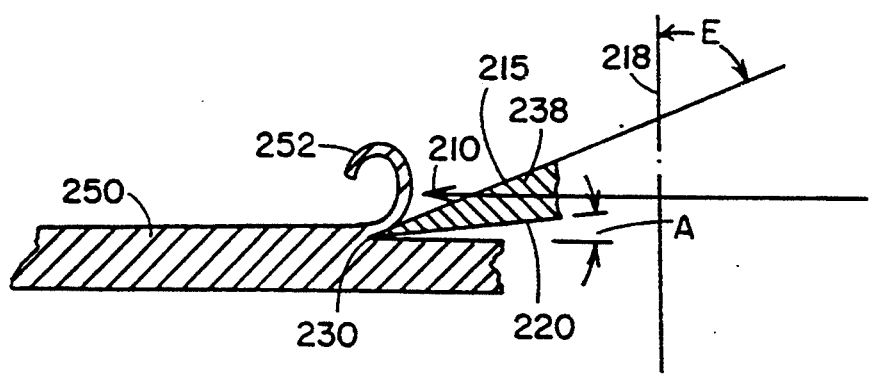
FIG. 8 is a schematic view showing the cutting action of a cutting blade.

In use of the twist drill, the point cutting edge 30 and chisel edge 38, the leading edges, first make contact with the bottom of the hole being drilled to slice off material being cut. As the cut is made, it is preferable that the surfaces of the drill do not rub against the shaving or chip. Therefore, the surface of the blade is angled away from the workpiece surface to provide a clearance. Refer now to FIG. 8 which illustrates this principle. Although FIG. 8 illustrates orthogonal cutting, it is shown for simplicity for the purposes of explanation of the general principles which are similar for rotational cutting. A blade 238 has a cutting edge 230 which is shown in the action of cutting a shaving 252 from a workpiece 250. The blade is moving in the direction of arrow 270 which is normal to twist drill axis 218. The angle A formed by the surface 220 in the direction of cut 270 is called the clearance angle or the relief angle. If the clearance angle were equal to zero, then the cutting face 220 would rub against the workpiece 250 after the cut was made by cutting edge 230. The angle E formed between the surface 215 of cutting blade 238 and axis 218 is called the rake angle and the area of surface 215 near edge 230 is referred to as the rake surface.

Referring back to FIG. 1 the inner flank surface 22, the groove surface 24 and the outer flank surface 26 are formed on the drill point 16 so as to have clearance angles with respect to the point cutting edge 30 as discussed above, in principle, with respect to FIG. 8.

In the embodiment of FIGS. 1 and 2, preferably the clearance angle $A_1$, the clearance angle of the outer flank surface 26 at the outer diameter 17, is from about eight degrees to about fifteen degrees. Preferably the clearance angle $A_2$ of the groove surface 24, at the arc cutting edge 34, at a point axially farthest from center peak 40, is from about ten degrees to about nineteen degrees. In addition to the clearance represented by clearance angle A, a side clearance is also desirable for the same reasons. In this regard, typically the side blades will have a reduced diameter starting at some distance behind the margin 39. Similarly, the groove surface 24 should widen from the arc cutting edge 34 to the arc heel edge 35, which is formed by the intersection of the groove surface 24 and the split surface 28. The widening of the groove surface 24 provides clearance to lessen the rubbing of the cut sliver or chip against the sides of the groove surface 24 along the groove edges 23 and 25.

The primary chisel angle $B_1$ is preferably from about one hundred ten degrees to about one hundred thirty-five degrees. The secondary chisel angle $B_2$ is preferably from about one hundred thirty degrees to about one hundred fifty-five degrees. The chisel width b is preferably from about one percent to about four percent of diameter 17. In the embodiment shown in FIG. 1, inner flank surface 22 and outer flank surface 26 have a common included angle C between their respective flank cutting edges, which angle C is preferably from about one hundred eighteen degrees to about one hundred thirty-five degrees.

The width $d_1$ of flank surface 26 at outer cutting edge 36 is preferably from approximately ten percent to about twenty-five percent of the outside diameter 17. The width $d_2$ of groove surface 24, which is the straight line distance between the edges 23 and 25 at arc cutting edge 34, is preferably from about ten percent to about twenty-five of the outside diameter 17. The radius of curvature R of the groove surface 24 is preferably about ten percent to twenty-five percent of the outside diameter 17.

One preferable combination of parameters of a twist drill made according to the first preferred embodiment of the present invention is a clearance angle $A_1$ of about ten degrees, a clearance angle $A_2$ of about thirteen degrees, a primary chisel angle $B_1$ of about one hundred fifteen degrees, a secondary chisel angle $B_2$ of about one hundred and thirty degrees, a chisel width b of about one percent of diameter 17, an included angle C of about one hundred and thirty-five degrees, an outer flank width $d_1$ of about fifteen percent of diameter 17, a groove width $d_2$ of about fifteen percent of diameter 17, and a radius of curvature R of the groove surface of about ten percent of diameter 17.

Figure 3:
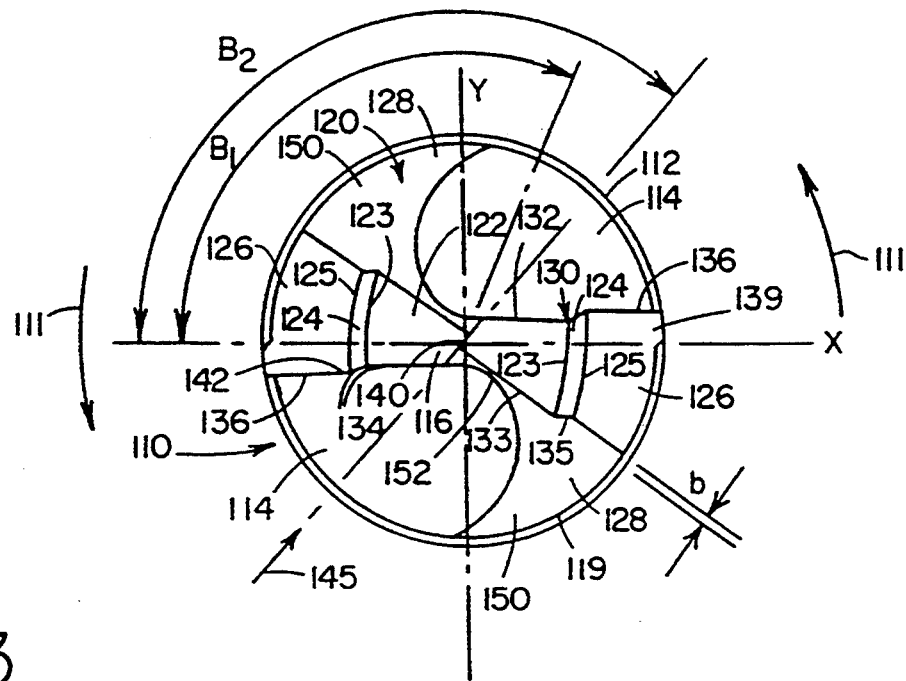
FIG. 3 is a point end view of the second embodiment of a twist drill according to the present invention.
Figure 4:
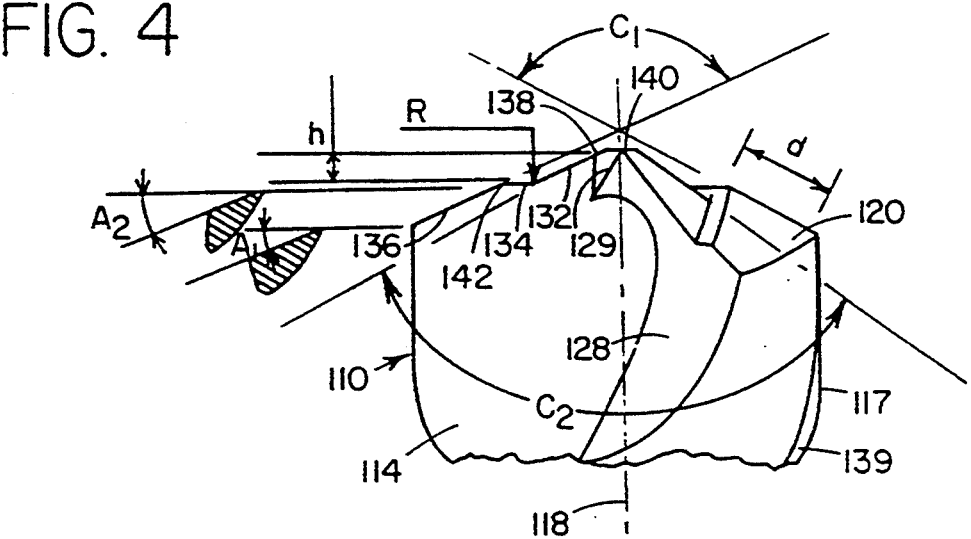
FIG. 4 is a partial side view of the drill of FIG. 3.

Refer now to FIGS. 3 and 4 wherein a second preferred embodiment of the present invention, generally referred to by reference numeral 110, is shown. The twist drill 110 is made from a longitudinally extending rod having a longitudinal axis of symmetry 118 and a shank portion (not shown) sized and shaped to be grasped by a twisting tool such as an electric power drill. The twist drill 110 has a barrel portion 112 with cutting edges for drilling a hole in a workpiece. The barrel portion 112 includes two flutes 114 spiraling about the axis 118 and terminating at the point end 116 of the barrel portion 112. Formed between the two spiraling flutes 114 are two side blades 150 that are wing-shaped in cross-section and connected together at axis 118 by web 152. Side blades 150 spiral along the length of barrel 112 and have margins 139 at diameter 117. In use, the twist drill is rotated in the direction of arrows 111 and thrust forward into the workpiece. All cutting edges are leading edges with respect to that direction of rotation. The portion of wings 150 trailing behind cutting edge 139 has a reduced diameter 119 referred to as the side blade clearance diameter.

The point end 116 has a number of point surfaces 120, including an inner flank surface 122, an outer flank surface 126, a groove surface 124 positioned between the inner and outer flank surfaces and a split surface 128. The inner flank surface 122 extends from the center or inner peak 140 of the point end 116 to the inner extent of the groove surface 124 to form groove inner edge 123. The outer flank surface 126 extends from the outer diameter 117 of point end 116 to the outer extent of groove surface 124 to form groove outer edge 125. The split surface 128 is formed on twist drill 110 to control the chisel width b.

Progressing from the inner peak 140 of the drill point 116 to the outside diameter 117, the point cutting edge 130 includes a secondary chisel edge 138 formed by the intersection of the inner flank surface 122 and side split surface 129 and then an inner cutting edge 132 formed by the intersection of the inner flank surface 122 and the flute 114. Next is the arc cutting edge 134 formed by the intersection of the groove surface 124 and the flute 114 and last is the outer cutting edge 136 formed by the intersection of the outer flank surface 126 and the flute 114. Extending from the center peak 140 to the innermost extent of the inner cutting edge 132 and formed by the intersection of the inner flank surface 122 and the side split surface 129 is the secondary chisel edge 138. Chisel edge 138 acts as a cutting edge. The rake angle, which is between the axis 118 and the side split surface 129 as viewed from direction 145, is about zero to about five degrees and is preferably positive.

In use of the twist drill, the point cutting edge 130 and chisel edge 138, the leading edges, first make contact with the workpiece being drilled to slice off material being cut. As the cut is made, it is preferable that the surfaces of the drill do not rub against the shaving or chip. Therefore, the surface of the blade is angled away from the workpiece surface to provide a clearance.

Referring back to FIG. 3 the inner flank surface 122, the groove surface 124 and the outer flank surface 126 are formed on the drill point 116 so as to have clearance angles with respect to the point cutting edge 130 as discussed above, in principle, with respect to FIG. 8.

In the embodiment of FIGS. 3 and 4, preferably the clearance angle $A_1$, the clearance angle of the outer flank surface 126 at the outer diameter 117, is from about eight degrees to about fifteen degrees. Preferably the clearance angle $A_2$ of the groove surface 124, at the arc cutting edge 134, at a point axially farthest from center peak 140, is from about ten degrees to about nineteen degrees. In addition to the clearance represented by clearance angle A, a side clearance is also desirable for the same reasons. In this regard, typically the side blades will have a reduced diameter starting at some distance behind the margin 139. Similarly, the groove surface 124 should widen from the arc cutting edge 134 to the arc heel edge 135, which is formed by the intersection of the groove surface 124 and the split surface 128. The widening of the groove surface 124 provides clearance to lessen the rubbing of the cut sliver or chip against the sides of the groove surface 124 along the groove edges 123 and 125.

In the second preferred embodiment, the primary chisel angle $B_1$ is preferably from about one hundred ten degrees to about one hundred thirty-five degrees. The secondary chisel angle $B_2$ is preferably from about one hundred thirty degrees to about one hundred fifty-five degrees. The chisel width b, the length of the normal distance between the heel edges 133, is preferably from about one percent to about four percent of diameter 117. In the embodiment shown in FIG. 3, inner flank surface 122 and outer flank surface 126 have separate included angles $C_2$ and $C_1$ respectively. $C_1$ and $C_2$ are each preferably from about one hundred eighteen degrees to about one hundred thirty-five degrees.

The width d of flank surface 126 at outer cutting edge 136 is preferably from approximately twenty percent to about thirty percent of the outside diameter 117. The radius of curvature R of the groove surface is preferably from about ten percent to about twenty percent of the outside diameter 117. The peak height h is preferably from about three percent to about five percent of outside diameter 117.

One preferable combination of parameters of a twist drill made according to the second preferred embodiment of the present invention is a clearance angle $A_1$ of about ten degrees, a clearance angle $A_2$ of about thirteen degrees, a primary chisel angle $B_1$ of about one hundred fifteen degrees, a secondary chisel angle $B_2$ of about one hundred and thirty degrees, a chisel width b of about one percent of diameter 117, an included angle $C_1$ of about one hundred thirty-five degrees, an included angel $C_2$ of about one hundred ten degrees, an outer flank width d of about twenty percent of diameter 117, a peak height h of four percent of diameter 117, and a radius of curvature R of the groove surface of about ten percent of diameter 117.

Another preferred embodiment of the second embodiment has a combination of parameters as in the preceding paragraph except the angles $C_1$ and $C_2$ are one hundred eighteen degrees and one hundred thirty degrees respectively.

For both preferred embodiments discussed above, preferably clearance angle $A_2$ is at least about two degrees larger than clearance angle $A_1$. Moreover, the following general observations have been made concerning the variance in performance of the twist drill constructed according to the present invention as certain parameters are adjusted. As the groove width $d_2$ gets wider, the self-centering of the twist drill improves. As the outer flank width is reduced, the amount of burr formed at the drilled hole exit is reduced, particularly for workpieces such as sheet metal, giving a better quality of hole, but the self-centering capability of the drill is decreased. As the included angle C or $C_1$ increases, hole quality also increases. As angle $C_2$ is decreased, penetration rate increases. As the magnitude of h, the point height, is increased, the self-centering capability of the twist drill increases. However, if h is too large, the twist drill may exhibit a higher tendency to fracture, yielding lower tool life. As the primary chisel width b increases, penetration rate and self-centering decrease. If b is too small, however, the twist drill point will wear quickly.

The center or inner peaks 40 and 140 and the outer or edge peaks 42 and 142 are the first points of the cutting edges to contact the workpiece as the twist drill moves axially therethrough. The existence of multiple peaks is a characteristic of multi-surfaced drills which cut the workpiece into a number of narrow ribbons which are easy to eject.

Figure 5:
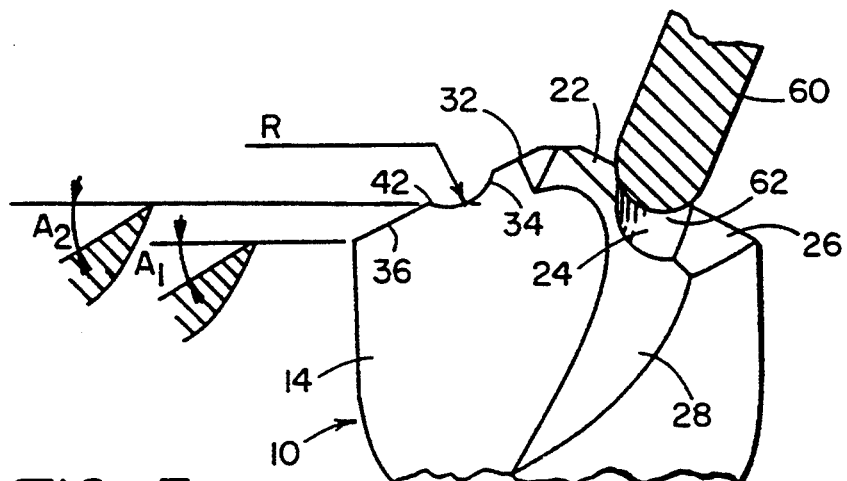
FIG. 5 is a view like FIG. 2 showing a partial cross section of a grinding wheel used to form the groove surface in the first embodiment.
Figure 6:
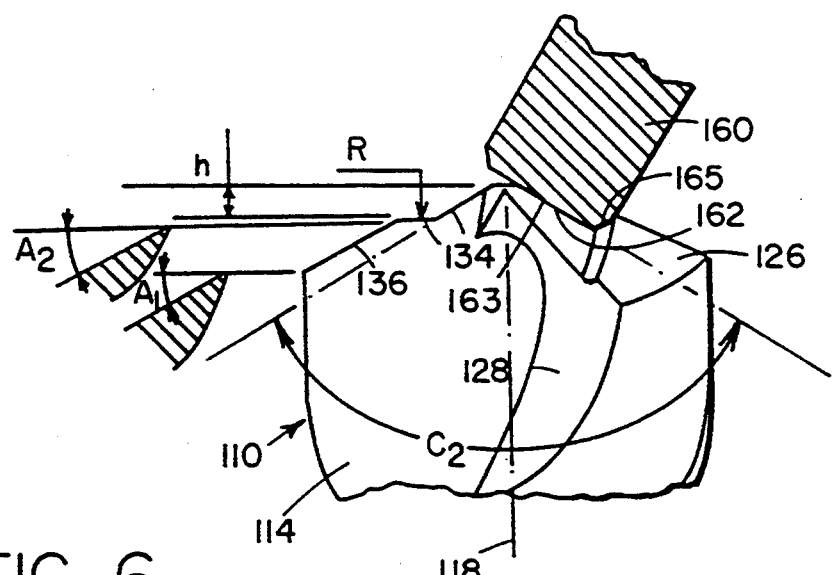
FIG. 6 is a view like FIG. 4 showing a partial cross-section of a grinding wheel used to form the groove surface in the second embodiment.

Refer now to FIGS. 5 and 6 which illustrate grinding steps used in forming the point surfaces of twist drills 10 and 110, respectively. A twist drill is typically manufactured by taking a solid metal cylindrical bar or rod and cutting it into lengths approximating the length of the finished twist drill. The outside diameter of the cut rod is then ground to the diameter specifications of the barrel and the shank. The ground cut rod then may be heat treated to make it harder. After the heat treating, the outside surfaces may be cleaned by blasting with particulate or by chemical washing to remove a thin layer of chemical deposits that may form during the heat treating. Then the flutes of the rod are ground in a flute grinding machine. For a twist drill having two flutes, typically the first flute is ground on the machine and then the rod is rotated in the chuck one hundred eighty degrees and then the second flute is ground. Next, the clearance diameter along the outside of the cutting blades along the barrel of the drill is cut. Upon completion of this step, the drill point surfaces are then ground. Regarding the embodiment of FIGS. 1 and 2, the inner flank surface 22 and the outer flank surface 26 may be ground in a single step. The grinding wheel may be contoured and the drill moved relative to it so as to form flank surfaces 22 and 26 which are conical. Alternatively, flank surfaces 22 and 26 could be helical, flat, hyperbolic, parabolic, or other shapes. Next, the groove is ground with the grinding wheel 60 which is a large circular disk spinning in the plane of the disk. FIG. 5 shows a partial cross-section taken across the edge of the disk showing the contour of the disk edge which in the case of FIG. 5 is semicircular having a radius of curvature R. Alternatively, edge 62 could have a cross-section that is not semi-circular. The groove is cut starting with the leading edge of the flank surfaces 22 and 26 and progressing towards the trailing or heel edges. The drill and grinding wheel 60 are moved relative to each other such that the groove surface 24 is cut gradually deeper and wider from the cutting edge of the point surface to the trailing or heel edge. This is done as discussed above to give side clearance in groove 24. The groove 24 may be cut with similar motions as used for cutting the flank surface such as to result in a circular path about a conical surface. Other paths could be used such as straight, or elliptical, or as others. Next the split surface 28 is ground. This grinding also produces the side split surface 29.

Refer now to FIG. 6 wherein is shown a grinding step for the second preferred embodiment of the invention shown by FIGS. 3 and 4. The steps for grinding the faces on drill 110 are similar to those for grinding the faces on drill 10 except that grinding wheel 160 is sized to extend to intersect axis 118. Grinding wheel 160 has an edge 162 that has a flat surface 163 which grinds the inner flank surface 122 and a curved surface 165 with a radius of curvature R that grinds groove 124. The contours of 163 and 165 may or may not be tangent at the point where they intersect and thus the inner flank surface 122 and the groove surface 124 may or may not be tangent at the edge of which they intersect. It has been found to be more important for this second preferred embodiment, than for the first preferred embodiment, to grind the groove surface 124 prior to grinding the split surface 128 to keep the correct primary chisel width b.

Inner flank surface 122 is conical in the preferred embodiment, but alternatively it could be flat, helical or other shapes. For conical grinding, the axis of symmetry of the cone defining the surface 124 is skewed from axis 118 to provide a clearance or relief angle for surface 124.

The grinding steps can be accomplished on commercially available grinding machines such as the Normac Models P500 for the flank surfaces and SP-21 for the split surfaces. To grind the groove surfaces 24 and 124 some modification of the commercially available machines is required. For example a Normac P500 machine was equipped with a Borazon grinding wheel having a dresser.

The above description and drawings are only illustrative of preferred embodiments which achieve the objects, features and advantages of the present invention, and it is not intended that the present invention be limited thereto. Any modifications of the present invention which comes within the spirit and scope of the following claims is considered part of the present invention.

What is claimed as new and desired to be protected by Letters Patent of the United States is:

1. A twist drill comprising a fluted barrel portion having two flutes, a point end having a chisel and split point formed on said point end, said split point including two opposing inner flank surfaces extending from the center of said point end to the inner extents of two opposing respective groove surfaces, two opposing outer flank surfaces extending from the outer diameter of said point end to the outer extents of said respective opposing groove surfaces and two opposing side split surfaces adjacent the chisel edge, said groove being formed about the center axis of the drill.

2. A twist drill comprising a fluted barrel portion having two flutes, a point end and point surfaces formed on said point end, said point surfaces including two opposing inner flank surfaces extending from the center of said point end to the inner extents of two opposing respective groove surfaces, two opposing outer flank surfaces extending from the outer diameter of said point end to the outer extents of said respective opposing groove surfaces and two opposing split surfaces, said groove being formed along a generally circular path about the center axis of the drill.

3. A twist drill comprising a fluted barrel portion having two flutes, a point end and point surfaces formed on said point end, said point surfaces including two opposing inner flank surfaces extending from the center of said point end to the inner extents of two opposing respective groove surfaces, two opposing outer flank surfaces extending from the outer diameter of said point end to the outer extents of said respective opposing groove surfaces and two opposing split surfaces, said groove being formed about the center axis of the drill.

4. A twist drill comprising a longitudinally extending rod having a longitudinal axis and a shank portion sized and shaped to be grasped by a twisting tool and having a barrel portion for cutting a workpiece, said barrel portion having a number of flutes formed therein spiraling about said axis and terminating at a point end of said barrel portion, said point end having a number of point surfaces including an inner flank surface, an outer flank surface, a groove surface positioned between said inner and outer flank surfaces and a split surface, said inner flank surface extending from the center of said point end to the inner extent of said groove surface, said outer flank surface extending from the outer diameter of said point end to the outer extent of said groove surface;

said groove having a radius of curvature equal to about ten to about twenty percent of said diameter, an inner peak formed at the center of the point end and an outer peak formed at the intersection of said groove surface and said outer flank surface, the axial distance between said inner peak and outer peak being from about three to about five percent of said diameter;

a cutting edge formed by the intersection of said point surfaces and the rake surface of said flutes at the leading side of said point surfaces, said cutting edge including an inner cutting edge formed along said inner flank surface, an arc cutting edge formed along said groove surface, and an outer cutting edge formed along said outer flank surface;

said outer cutting edge having a clearance angle at its outermost extent of between about eight degrees to about fifteen degrees;

said arc cutting edge having a clearance angle at its extent axially farthest from said center peak of between about ten degrees to about nineteen degrees;

said inner and outer flank surfaces having included angles of between about one hundred ten degrees to about one hundred thirty five degrees;

the length of said outer cutting edge being between about twenty percent to about thirty percent of said diameter;

a chisel edge formed at said inner peak having a length of between about one percent to about four percent of said diameter; and said point surfaces forming a primary chisel angle of between about one hundred ten to about one hundred thirty-five degrees and a secondary chisel angle of between about one hundred thirty and about one hundred fifty-five degrees.

5. A method for making a drill comprising the steps of: providing a split point drill and forming a groove in at least one primary clearance surface of said drill along a generally circular path about the center axis of the drill.

6. A method as in claim 5 wherein said groove is formed to widen from an arc cutting edge to an arc heel edge.

7. A method as in claim 6 wherein said groove is formed along a generally circular path.

8. A method as in claim 5 further comprising the steps of removing material from said primary clearance surface of said drill between said groove and the drill axis.

9. A method as in claim 8 wherein said material is removed so that the portion of the primary clearance surface of said drill between the groove and the drill axis is at a different angle with reference to the drill axis than the portion of the primary clearance surface between the groove and the diameter of the drill.

10. A method for making a drill comprising the steps of: providing a split point drill and forming a groove in at least one primary clearance surface of said drill, wherein said groove is formed to widen from an arc cutting edge to an arc heel edge.

11. A method as in claim 10 wherein said groove is formed along a generally circular path.

12. A method for making a drill comprising the steps of: providing a split point drill and forming a groove in at least one primary clearance surface of said drill and removing material from said primary clearance surface of said drill between said groove and the drill axis.

13. A method as in claim 12 wherein said material is removed so that the portion of the primary clearance surface of said drill between the groove and the drill axis is at a different angle with reference to the drill axis than the portion of the primary clearance surface between the groove and the diameter of the drill.

14. A method for making a drill comprising the steps of: providing a split point drill having a drill axis and an outer diameter and at least one primary clearance surface extending between said drill axis and said outer diameter; forming a groove in said at least one primary clearance surface to form an inner primary clearance surface between an inner extent of said groove and said drill axis and to form an outer primary clearance surface between an outer extent of said groove and said outer diameter; and removing material from said primary clearance surface of said drill.

15. A method as in claim 14 wherein said material is removed from said inner primary clearance surface.

16. A method as in claim 15 wherein said material is removed to form a conical surface on said inner primary clearance surface.

17. A method as in claim 14, wherein said steps of forming the groove and removing material from the clearance surface are performed simultaneously.

18. A method as in claim 14 when said steps of forming the groove and removing material are performed using a single grinding tool.

19. A method as in claim 18 when said grinding tool has at least a first and second grinding portions and said first grinding portion is contoured to form the groove and said second portion is contoured to remove material from said primary clearance surface.

* * * * *